(12) United States Patent
Kashi et al.

(10) Patent No.: US 8,589,542 B2
(45) Date of Patent: Nov. 19, 2013

(54) FIRST APPLICATION RECEIVING TEXT SCRIPT OR APPLICATION PROGRAM INTERFACE (API) CALL FROM SECOND APPLICATION AND EXECUTING APPLICATIONS IN INDEPENDENT MEMORY SPACES

(75) Inventors: Kamran Kashi, Centreville, VA (US); Charles Amoury, Santana de Parnaiba (BR); Yamin Muyal, Santa Cecilia-São Paulo (BR); Stephen Vest, Palm Bay, FL (US); Ajit Shrestha, West Melbourne, FL (US)

(73) Assignee: QualiTest Technologies, Inc., Palm Bay, FL (US)

( * ) Notice: Subject to any disclaimer, the term of this patent is extended or adjusted under 35 U.S.C. 154(b) by 39 days.

(21) Appl. No.: 13/142,264

(22) PCT Filed: Feb. 16, 2009

(86) PCT No.: PCT/US2009/034220
§ 371 (c)(1),
(2), (4) Date: Jun. 24, 2011

(87) PCT Pub. No.: WO2010/093369
PCT Pub. Date: Aug. 19, 2010

(65) Prior Publication Data
US 2012/0059899 A1    Mar. 8, 2012

(51) Int. Cl.
*G06F 15/173*    (2006.01)
(52) U.S. Cl.
USPC ......................................................... 709/224
(58) Field of Classification Search
USPC .................... 709/221–224; 719/328
See application file for complete search history.

(56) References Cited

U.S. PATENT DOCUMENTS

| | | | | |
|---|---|---|---|---|
| 4,599,720 A | * | 7/1986 | Kunzinger | 370/321 |
| 5,781,703 A | * | 7/1998 | Desai et al. | 706/50 |
| 5,845,062 A | | 12/1998 | Branton, Jr. et al. | |
| 5,870,558 A | | 2/1999 | Branton, Jr. et al. | |
| 6,061,332 A | | 5/2000 | Branton, Jr. et al. | |
| 6,061,723 A | * | 5/2000 | Walker et al. | 709/224 |
| 6,148,336 A | * | 11/2000 | Thomas et al. | 709/224 |
| 6,859,829 B1 | * | 2/2005 | Parupudi et al. | 709/224 |
| 7,133,907 B2 | * | 11/2006 | Carlson et al. | 709/220 |
| 7,143,159 B1 | * | 11/2006 | Grace et al. | 709/224 |
| 7,392,046 B2 | | 6/2008 | Leib et al. | |
| 8,001,232 B1 | * | 8/2011 | Saulpaugh et al. | 709/224 |
| 8,161,152 B2 | * | 4/2012 | Ogielski et al. | 709/224 |
| 2005/0176418 A1 | | 8/2005 | Leib et al. | |
| 2006/0026467 A1 | | 2/2006 | Nehab et al. | |
| 2007/0294385 A1 | * | 12/2007 | Kapadekar et al. | 709/223 |
| 2012/0290716 A1 | * | 11/2012 | Ogielski et al. | 709/224 |

FOREIGN PATENT DOCUMENTS

| | | |
|---|---|---|
| JP | 2003318949 | 11/2003 |
| KR | 10-2002-0078240 | 10/2002 |
| WO | PCT/US2009/034220 | 10/2009 |
| WO | PCT/US2009/034220 | 8/2011 |

* cited by examiner

*Primary Examiner* — Lance L Barry
(74) *Attorney, Agent, or Firm* — Wells St. John P.S.

(57) ABSTRACT

Communications-network data processing methods include receiving a request to perform an action involving data associated with a configuration of a communications network or a behavior of the communications network and in response to the receiving of the request, performing the action. Communications-network data presentation methods include receiving information indicating a source of data characterizing a communications network and a desired presentation format of the data, accessing the source to obtain the data characterizing the communications network, and presenting the data according to the desired presentation format.

12 Claims, 9 Drawing Sheets

```
dim gtPoly as itable
dim gtStats as itable
dim gtHist as itable
dim strSheet as string = "Stats"
dim strAnalysis as string = "Polygon statistics"
dim intCols as integer = 7
dim strFillColor as string = "LightGray"
dim intRow as integer ' filter by polygon
gtTmp = findtbl (gtTbl, "[" & strColName & "] is not null")
if strVectorName <> " " then
    gtPoly = _filtertblvector (gtTmp, strVectorName)
else
    gtPoly = gtTmp
end if ' get stats table
gtStats = statscol (gtPoly, strColName, 2)

' get histogram table
' Generate bins
intBinCnt = intBinCnt - 2
dblBeg = floor (gtStats (1, "Minimum") )
dblEnd = ceiling (gtStats (1, "Maximum") )
dblStep = (dblEnd - dblBeg) / intBinCnt
gtBins = rng (dblBeg, dblStep, dblEnd)
for i as integer = 1 to gtBins . rowcount
    gtBins (i,1) = round (gtBins (i, 1) , 2)
next
gtHist = histe (gtPoly, strColName, gtBins)
```

FIRST APPLICATION RECEIVING TEXT SCRIPT OR APPLICATION PROGRAM INTERFACE (API) CALL FROM SECOND APPLICATION AND EXECUTING APPLICATIONS IN INDEPENDENT MEMORY SPACES

CROSS REFERENCE TO RELATED APPLICATION

This application is a 35 U.S.C. §371 of and claims priority to PCT International Application No. PCT/US2009/034220 which was filed on 16 Feb. 2009, and was published in English, the teachings of which are incorporated herein by reference.

TECHNICAL FIELD

The present invention, in various embodiments, relates to communications-network data processing methods, communications-network data processing systems, computer-readable storage media, communications-network data presentation methods, and communications-network data presentation systems

BACKGROUND

Ensuring that a communications network is operating properly is challenging because network problems can be difficult to uncover. Over the years, specialized tools have been developed to collect data from a communications network that may be helpful in identifying and resolving network problems. Often, however, these tools are created by different vendors and do not integrate well with each other. As a result, network operators typically manually correlate small amounts of the data generated by different tools to identify and resolve network problems. Since many of the tools generate large volumes of data, manually processing a substantial portion of the data may be impossible or highly impractical.

For example, in a wireless-communications network, a network operator may need to manually correlate call trace data collected by an Operations Support System (OSS) of a wireless-telephone switch with call status information collected by a wireless telephone to identify and resolve dropped call problems. Such manual correlation is inefficient because it is time consuming and requires a high level of expertise with a variety of different data collection tools and data formats.

Furthermore, to solve each of a variety of communications-network issues, the data collected by the tools may need to be processed differently. Accordingly, a tool that attempts to automate this data processing should allow the network operator to custom design his own methods of data processing for the tool.

BRIEF DESCRIPTION OF THE DRAWINGS

Preferred embodiments of the invention are described below with reference to the following accompanying drawings.

FIG. 4 illustrates a script according to an embodiment.

DETAILED DESCRIPTION

Embodiments of communications-network data processing methods, communications-network data processing systems, computer-readable storage media, communications-network data presentation methods, and communications-network data presentation systems are described below in relation to FIGS. 1-8.

Figure 1:
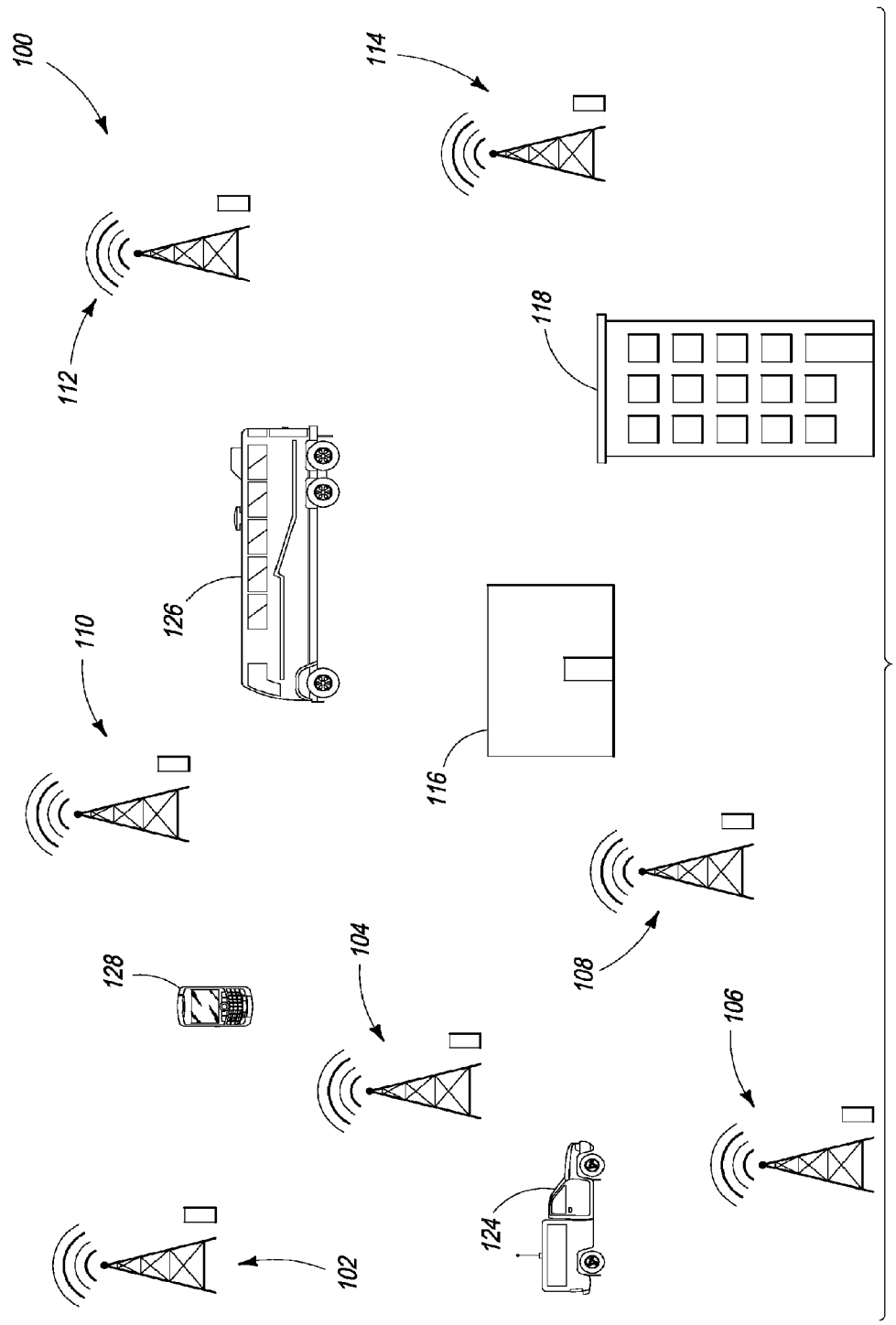
FIG. 1 is a diagram of a communications network according to an embodiment.

Referring to FIG. 1, a wireless-communications network 100 according to an embodiment is illustrated. FIG. 1 is provided to illustrate one possible embodiment. Other embodiments including fewer, more, or alternative components are also possible. In addition, some components of FIG. 1 may be combined in some embodiments.

Network 100 may provide several different services to subscribers (e.g., wireless-telephone services and wireless-data services). Network 100 includes several base stations 102, 104, 106, 108, 110, 112, and 114. Base stations 102, 104, 106, 108, 110, 112, and 114 may include wireless transceivers (e.g., radio frequency transceivers), antennas, towers, and control equipment and may transmit wireless signals to mobile communications devices (e.g., mobile communications device 128) and may receive wireless signals from the mobile subscriber devices.

Base stations 102, 104, 106, 108, 110, 112, and 114 may be in communication with a switching center 116 via telecommunication links such as wired links or wireless links (e.g., microwave links). Switching center 116 may facilitate communication between the base stations and may additionally interface communication between the base stations and the public switched telephone network (PSTN) and communication between the base stations and a packed switched data network (PSDN). The PSDN may be connected to the Internet or other data networks. In an embodiment, switching center 116 may include some or all of the devices of the PSDN including routers, switches, and other data communication devices that facilitate communication between the base stations and the Internet or other data networks. Although depicted as a single building in FIG. 1, switching center 116 may include several physical buildings.

Mobile communications devices (e.g., mobile communications device 128) may be wirelessly connected to network 100 and may communicate with the PSTN, Internet, or other communications networks via one or more of the base stations.

Network 100 may include other devices not illustrated in FIG. 1. For example, network 100 may include additional switching centers, mobile communications devices, routers, switches, and base stations.

To ensure that network 100 provides quality services to subscribers, a network operator may need to analyze and/or review data related to the configuration and/or behavior of network 100. Configuration data may include data that describes how devices of network 100 are configured and/or programmed to operate. For example, configuration data may include the azimuth, tilt, height, and/or beam width of an antenna; a list of neighboring base stations to which a communications session may be transitioned from a particular base station; a transmit power level or acceptable range of transmit power levels of a transceiver; an identification code used in a wireless transmission; a timer used to detect a dropped call; a maximum and/or minimum data rate of a communications session; an identifier assigned to a base station; a bit-error rate threshold used to determine acceptable communications; a CODEC to be used for a communications session; etc.

Behavior data may include data that describes events and/or measurements that have occurred on the network 100. For example, behavior data may include data describing a quantity of calls processed by a base station during a particular time period; a bit-error rate or block-error rate during a particular communications session; a number of calls dropped by the network or by a particular base station during a time period; the number and type of control messages and/or commands (e.g., handoff commands or power level adjustment commands) sent by a base station to a mobile communications device or by a mobile communications device to a base station; various power levels of a signal transmitted by a mobile communications device and received by a base station during a communications session; an amount of data relayed between one of the base stations of network 100 and switching center 116; etc.

Configuration and/or behavior data for network 100 may be collected by a variety of devices. Base stations 102, 104, 106, 108, 110, 112, and 114 and switching center 116 may collect configuration and/or behavior data. In some embodiments, this data may be consolidated at switching center 116 and may be stored by a Business Support System (BSS) or OSS of switching center 116. In an embodiment, the base stations may include devices such as radio controllers, base station controllers, and test probes configured to measure and/or decode signals being received by or transmitted by the base stations.

Mobile communications devices (e.g., mobile communications device 128) may also collect configuration and/or behavior data for network 100. For example, device 128 may collect data related to a particular wireless communications session (e.g., a data session or a telephone call) conducted by device 128. The data collected by device 128 may include, for example, commands received by device 128, commands and/or requests transmitted by device 128, measurements made by device 128, etc.

A mobile test device 124, may also collect configuration and/or behavior data for network 100. Mobile test device 124 may be a drive test system configured to make test phone calls and collect data related to the test phone calls while the drive test system is transported through a geographic area serviced by network 100. Additionally or alternatively, mobile test device 124 may include one or more receivers configured to make measurements of wireless signals present on particular frequencies within the geographic area serviced by network 100. Mobile test device 124 may demodulate and/or decode the wireless signals.

In some cases, the wireless signals may be signals transmitted by one or more of base stations 102, 104, 106, 108, 110, 112, and 114. In other cases, the wireless signals may be signals transmitted by devices that are not a part of network 100 and may be considered interference. In some embodiments, the one or more receivers may be referred to as a scanner or scanning receiver.

Mobile test device 124 may, in an embodiment, be a "manned" device meaning that a network operator may control device 124 as it is transported through the geographic area serviced by network 100 to collect data of interest to the network operator.

Network 100 includes another mobile test device 126 that may perform some or all of the functionality of device 124 but may be considered an "unmanned" device that is not controlled or is minimally controlled by a network operator as it is transported through the geographic area serviced by network 100.

Network 100 may also include a network operations center (NOC) 118. NOC 118 may collect the configuration and/or behavior data generated by switching center 116 and/or base stations 102, 104, 106, 108, 110, 112, and 114. NOC 118 may collect similar data generated by other networks as well. In some embodiments, NOC 118 may collect additional configuration and/or behavior data.

Each of these data collection devices that collect configuration and/or behavior data related to network 100 may be considered to be connected to network 100 either by a wired or wireless link since each of these devices is either in one-way or two-way communication with network 100.

In an embodiment, some of the data collected by the data collection devices may be referred to as routinely collected data because the data collection devices may automatically collect this data according to a schedule and whether or not collection of the data has been requested. For example, base station 102 and/or switching center 116 may collect data related to the number and duration of calls made using base station 102 whether or not a user or application requests that base station 102 and/or switching center 116 collects the data. Other examples of routinely collected data may include dropped call data and error rate data.

Other data collected by the data collection devices may be referred to as ordered data because it is collected in response to an order or request. In an embodiment, ordered data might not be normally collected by the data collection devices unless the data collection devices are explicitly requested to collect the data. For example, the base stations and/or switching center 116 of network 100 may collect call trace data associated with some or all calls made by a particular mobile telephone or base station. The call trace data may include protocol messages received by or transmitted by a base station or received by or transmitted by a mobile telephone.

In an embodiment, ordered data may be collected for an amount of time specified by a request or order initiating collection of the ordered data. For example, the request may specify that the ordered data should be collected for an hour or for a day. The ordered data may be stored in a file, database, or other data structure. In an embodiment, the ordered data may be stored by the device collecting the ordered data. Drive test data collected by test devices 124 and 126 may be considered ordered data in an embodiment.

In an embodiment, the data collection devices of network 100 might not automatically collect the ordered data all of the time or for all devices of network 100 because doing so may generate such a large quantity of ordered data that the data collection devices might not have sufficient storage capacity to store the ordered data. Accordingly, ordered data may be requested for a limited amount of time or on a limited number of devices and the ordered data may then be used to troubleshoot a particular network problem.

Problems may arise in network 100 that may degrade the quality of service provided by network 100. For example, misconfiguration of the base stations or switching center 116 or of a mobile communications device may prevent proper operation of wireless communication sessions or interference between wireless signals in the geographic area serviced by network 100 may cause degraded or dropped communication sessions. A network operator may use the configuration and/or behavior data collected by the data collection devices to identify and resolve such problems. Methods, systems, programming, computer-readable media, devices, and other solutions that may aid the network operator in identifying and resolving such network problems are described in detail below.

Figure 9:
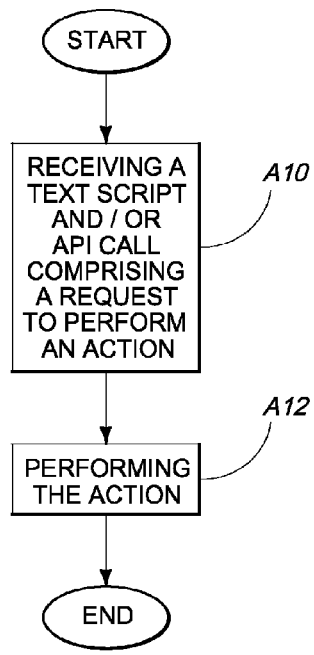
FIG. 9 is a flow chart of a method of the disclosure according to one embodiment.

According to one aspect of the invention, a communications-network data processing method shown in FIG. 9 includes, at an Act A10, receiving a request to perform an action involving data associated with a configuration of a communications network or a behavior of the communications network and in response to the receiving of the request, performing the action at an Act A12. The receiving of the request include one or both of accessing a text script including the request and receiving an application programming interface (API) call including the request.

The receiving of the request may include a first application receiving the request from a second application. The request may include an API call made by the second application. The method may also include executing the first application with a first computer and the second application may be executed by a second computer. The first application may include code that is compiled independent of the second application. The method may further include executing the first application in a first memory space and the second application may be executed in a second memory space independent of the first memory space. In some embodiments, the data might only accessible to the second application via the first application.

Alternatively or additionally, the receiving of the request may include accessing a script that includes the request. The script may be written in text by a user.

The communications network may be a wireless-communications network and the data may include at least one of dropped call data, blocked call data, wireless signal strength data, base station configuration data, antenna configuration data, call status data, call trace data, or handoff data.

The action involving the data may take one or more of a number of different forms. For example, the action may be a function call or method call of a function or method implemented by the first application. Additionally or alternatively, the action may include filtering the data to identify a subset of the data having a desired characteristic and/or formatting the data for presentation. The formatting of the data may include overlaying the data on a map.

Furthermore, the action may include acquiring the data from a device connected to the communications network, correlating in time or location a first portion of the data with a second portion of the data, and/or requesting that a device connected to the communications network collect the data.

The action may include converting a first portion of the data from a first format associated with a first device connected to the communications network to a second format associated with the first application and converting a second portion of the data from a third format associated with a second device connected to the communications network to the second format. The first device may have generated the first portion of the data and the second device may have generated the second portion of the data.

The method may further include additional steps or actions. For example, the method may further include, in response to the receiving of the request, accessing the data and the performing of the action may include performing the action using the data. The request may include a key and the method may include authenticating the request using the key prior to performing the action.

The method may further include validating that the action is permissible before performing the action, validating that a user who provided the request is authorized to perform the action before performing the action, notifying a user after performing the action that the action has been performed, and/or periodically repeating the performing of the action without receiving an additional request to perform the action.

The method may further include receiving a desired priority with which the first application should perform the action and using the desired priority to determine when to perform the action relative to other actions already scheduled to be performed by the first application.

According to another aspect of the invention, a communications-network data processing system includes one or more devices connected to a communications network and processing circuitry. The processing circuitry is configured to receive a request to perform an action involving data generated by the one or more devices and, in response to receiving the request, perform the action.

The processing circuitry may be referred to as first processing circuitry and the first processing circuitry may be configured to receive the request via an API from second processing circuitry that is physically distinct from the first processing circuitry.

The system may further include a user interface configured to provide results of the performing of the action. In an embodiment, the user interface may include a web server. The user interface may be configured to receive a script comprising the request and to provide the script to the processing circuitry.

Figure 2:
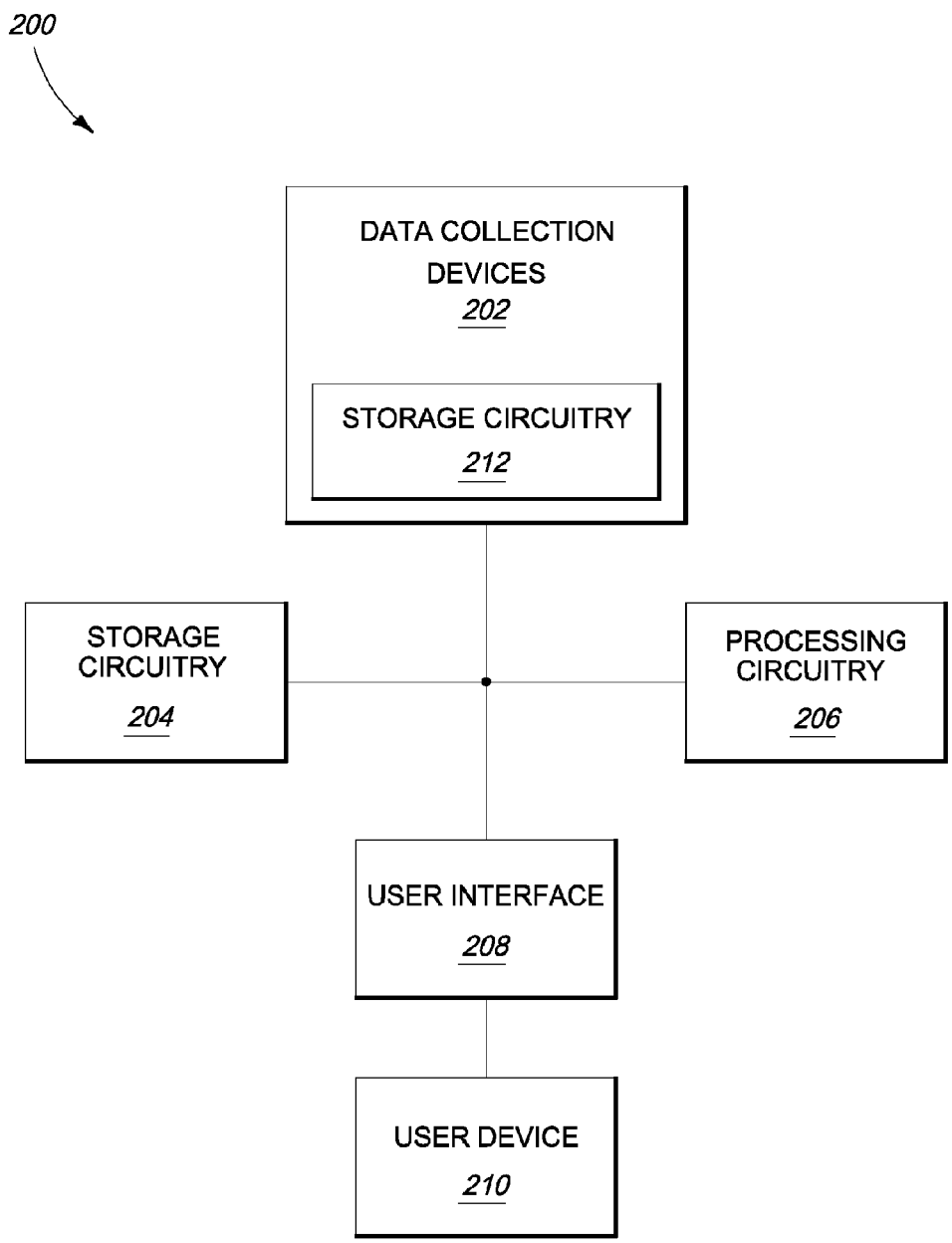
FIG. 2 is a block diagram of a communications-network data processing system according to an embodiment.

Referring to FIG. 2, a communications-network data processing system 200 according to an embodiment is illustrated. FIG. 2 is provided to illustrate one possible embodiment. Other embodiments including fewer, more, or alternative components are also possible. Furthermore, some components of FIG. 2 may be combined in some embodiments.

System 200 includes data collection devices 202, storage circuitry 204, processing circuitry 206, and user interface 208. System 200 may additionally include one or more user devices 210.

Processing circuitry 206 may comprise circuitry configured to implement desired programming provided by appropriate media in at least one embodiment. For example, processing circuitry 206 may be implemented as one or more of a processor and/or other structure configured to execute executable instructions including, for example, software and/or firmware instructions, and/or hardware circuitry. Exemplary embodiments of processing circuitry 206 include hardware logic, PGA, FPGA, ASIC, state machines, and/or other structures alone or in combination with a processor. These examples of processing circuitry 206 are for illustration and other configurations are possible. In an embodiment, processing circuitry 206 may include a single processor. In other embodiments, processing circuitry 206 may include a plurality of processors.

Storage circuitry 204 may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, flash memory, cache memory, and/or other configurations capable of storing programming, data, or other digital information. In an embodiment, storage circuitry 204 may store programming implemented by processing circuitry 206.

User interface 208 is configured to interact with a user including conveying data to a user (e.g., displaying data for observation by the user, audibly communicating data to a user, etc.) as well as receiving inputs from the user (e.g., tactile input, voice instruction, etc.). Accordingly, in an embodiment, the user interface may include a display (e.g., cathode ray tube, LCD, etc.) configured to depict visual information and an audio system as well as a keyboard, mouse and/or other input device. In another embodiment, user interface 208 may include a web server configured to provide data to user device 210 for display by user device 210. Any other suitable apparatus for interacting with a user may also be utilized.

User device 210 may be in communication with user interface 208 or, in some embodiments, may be in direct communication with processing circuitry 206. In an embodiment, user interface 208 may provide information to user device 210 and user device 210 may display the information to a user (e.g., a network operator), for example, in a web browser. Example implementations of user device 210 include computers, mobile phones, smart phones (e.g., an IPHONE®), personal digital assistants, web browsers, and other devices configured to present information to a user. User device 210 may be used to initiate the execution of a script or supplemental application, both of which are described below.

Data collection devices 202 may include one or more of the devices described above in relation to FIG. 1 that collect configuration and/or behavior data, namely base stations 102, 104, 106, 108, 110, 112, and 114, switching center 116, NOC 118, mobile communications device 128, mobile test device 124, and mobile test device 126. Data collection devices 202 could include other devices connected to network 100 but not illustrated in FIG. 1, for example, probes monitoring wireless or network interfaces and test and measurement equipment configured to monitor the base stations or switching center 116.

In an embodiment, data collection devices 202 may store configuration and/or behavior data in storage circuitry 212 that is part of data collection devices 202. For example, mobile test device 124 may store configuration and/or behavior data that it acquires from or observes from network 100 on a hard disk or other storage circuitry that is part of mobile test device 124.

Processing circuitry 206 may be in communication with one or more of data collection devices 202 and may retrieve configuration and/or behavior data from data collection devices 202 and store the data in storage circuitry 204. In some cases, processing circuitry 206 may control the way that data collection devices 202 acquire the configuration and/or behavior data. For example, processing circuitry 206 may instruct one of data collection devices 202 (e.g., switching center 116) to begin acquiring behavior data for a particular base station and to continue acquiring such data for a particular amount of time.

According to another aspect of the invention, a computer-readable storage medium is encoded with computer program instructions to cause processing circuitry to receive a request to perform an action involving data associated with a configuration of a communications network or a behavior of the communications network and, in response to receiving the request, perform the action.

According to another aspect of the invention, an article of manufacture includes media including programming configured to cause processing circuitry (e.g., a microprocessor) to perform processing that executes one or more of the methods described herein. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette, hard drive, random access memory, read only memory, flash memory, cache memory, and/or other configurations capable of storing programming, data, or other digital information.

In an embodiment, processing circuitry 206 may execute an application comprising computer program instructions that performs communications-network data processing.

Figure 3:
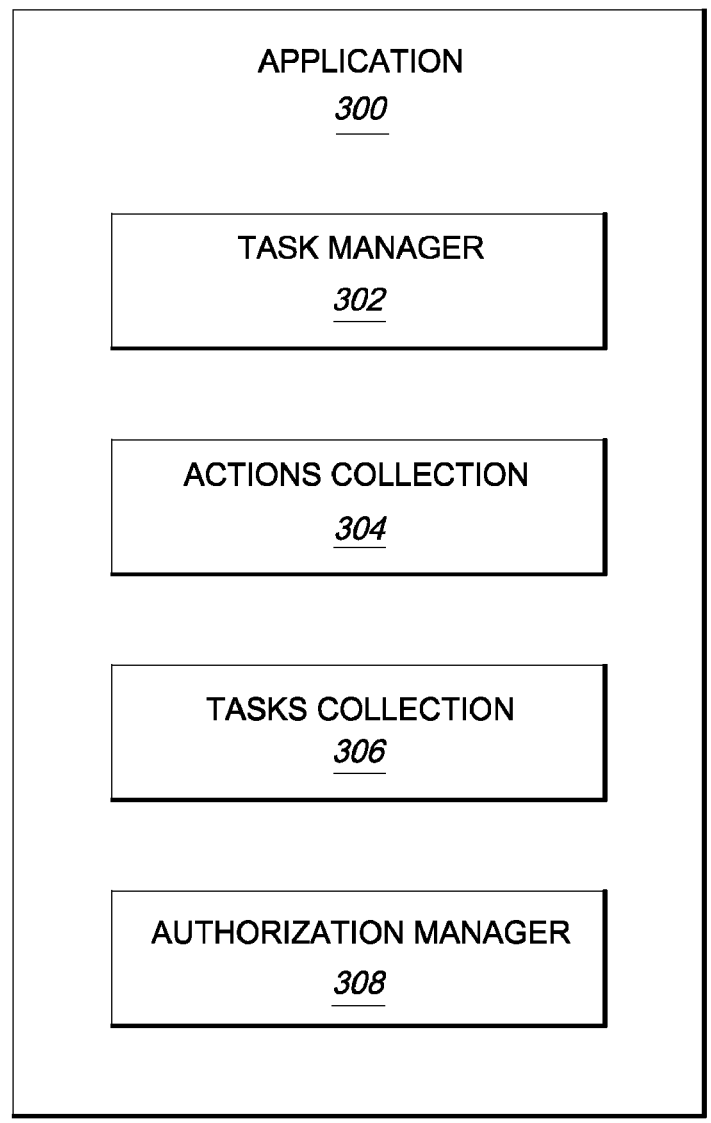
FIG. 3 is a block diagram of a communications-network data processing application according to an embodiment.

Referring to FIG. 3, a block diagram of an application 300 according to an embodiment is illustrated. FIG. 3 is provided to illustrate one possible embodiment. Other embodiments including fewer, more, or alternative components are also possible. In addition, some components of FIG. 3 may be combined in some embodiments.

Application 300 may be executed by processing circuitry 206. Accordingly, methods described herein as being performed by application 300 may alternatively be described as being performed by processing circuitry 206. Some or all of application 300 may be stored by storage circuitry 204. Application 300 includes task manager 302, actions collection 304, tasks collection 306, and may optionally include authorization manager 308.

Actions collection 304 may be a collection of actions that application 300 is configured to perform. In an embodiment, the actions may be functions and/or methods defined within application 300. In some embodiments, the actions of action collection 304 may be referred to as primitives. The functions and/or method may be stored as one or more libraries and may be stored by storage circuitry 204. The functions and/or methods may perform particular actions. Some of the actions may involve processing communications-network data acquired by data collection devices 202.

For example, one action may retrieve data from data collection devices 202. Another action may filter the retrieved data and yet another action may format the filtered data. Application 300 may selectively execute the actions of actions collection 304 to accomplish a particular objective.

In some cases, a sequence of related actions may be defined as a task. For example, a task may include actions that establish communication with data collection devices 202, provide authentication information to data collection devices 202, request data from data collection devices 202, and store the data in storage circuitry 204 once the data has been received from data collection devices 202. Tasks collection 306 includes a plurality of different tasks available for execution by application 300.

During execution, application 300 may initiate processing of a plurality of tasks from tasks collection 306. Task manager 302 may control the order and manner in which the tasks are completed. In an embodiment, upon requesting that a task be performed, application 300 may specify a priority associated with the task. Task manager 302 may use the priority to determine when to perform the task in relation to other tasks already being performed. In this manner, application 300 can influence the order in which tasks are performed. Furthermore, application 300 may specify that a particular task be repeated according to a periodicity or be repeated a particular number of times. Task manager 302 may use this information to determine when to repeat a task.

Using actions and/or tasks, application 300 may acquire communications-network data from data collection devices 202 and process the communications-network data. Application 300 may then provide the processed communications-network data to a network operator (e.g., via user interface 208 and/or user device 210). The network operator may use the processed communications-network data to identify problems with network 100 (e.g., dropped calls, high error rates, over or under utilization of resources, or other problems such as the problems described above in relation to FIG. 1). The network operator may then resolve the identified problems, for example, by changing the configuration of network 100.

Application 300 may be an open-architecture application that allows a user to define new tasks for application 300 to perform. Having an open-architecture enables application 300 to provide significant advantages over an application that does not allow a user to define new tasks. In known applications, when the application is initially provided to the user, the application is able to perform a limited, predefined set of tasks. The user may discover, during the course of using the known application, that a particular task, if available, would make communications-network troubleshooting more efficient. If the particular task is available as part of the predefined set of tasks enabled by the known application, the user may perform the particular task directly. However, if the particular task is not part of the predefined set of tasks available from the known application, the known application will not be able to perform the particular task.

With application 300, which is an open-architecture application, even if the particular task is not part of the predefined set of tasks, application 300 may still be able to perform the particular task if the user customizes application 300 to perform the particular task using, for example, a supplemental application, script, or custom report, each of which are described in detail below.

For example, known applications that do not have an open architecture may provide a report containing information associated with a communications network in response to receiving a request for the report. A network operator may want to receive the report via email each morning. With known applications, the network operator would need to manually request the report each morning.

In contrast, the network operator may customize application 300, which has an open architecture, by, for example, creating a new task for application 300 using a supplemental application, script, or custom report. Each morning, the new task may automatically and without user intervention create a report and email the report to the network operator.

In an embodiment, application 300 may be programmatically configured to perform a limited, predefined set of actions, tasks, and/or analysis. The set may be designed to include those actions, tasks, and/or analysis most commonly requested by network operators and may be initiated by a network operator via user interface 208.

The network operator, however, may want to perform actions, tasks, and/or analysis that are not included in the predefined set. For example, the predefined set may perform an analysis that identifies, for each dropped wireless telephone call occurring during a period of time, the radio channel that the call was assigned to prior to being dropped. The network operator may determine, however, that it would be more helpful to know whether any calls other than the dropped call were also assigned to the radio channel (on a base station different than the base station assigned to the call that dropped) at the time the call was dropped.

Although the predefined set might not perform this desired analysis, the network operator may design a custom set and/or sequence of the existing actions and/or tasks from actions collection 304 and tasks collection 306 that may perform this desired analysis and request that application 300 perform the custom set of actions and/or tasks. For example, the operator may design a new task that, although is not within tasks collection 306, accomplishes a desired result by executing a desired set and/or sequence of actions from actions collection 304 and/or tasks from tasks collection 306.

In an embodiment, a supplementary application (e.g., a plugin application) may be configured to work with application 300 to perform the custom set of actions and/or tasks (e.g., new tasks as described above) and may be configured to perform additional processing using data obtained from application 300, but which is performed independent of application 300.

To support such a supplementary application, application 300 may define one or more interfaces (e.g., APIs) that are accessible to the supplementary application. The interfaces may allow the supplementary application to request that application 300 perform one or more actions from actions collection 304 or tasks from tasks collection 306. The interfaces may be APIs and may result in a function call and/or method call of a function and/or method of application 300.

In an embodiment, the interfaces may comply with a standard. For example, the interfaces may be Visual Basic .NET interfaces.

The communications-network data acquired by data collection devices 202 need not be directly accessible to the supplementary application except via application 300. In other words, the supplementary application might not be able to communication directly with data collection devices 202. Instead, the supplementary application may request (e.g., via an API call) that application 300 perform a particular action or task that retrieves the communications-network data from data collection devices 202 and that application 300 provide the retrieved data to the supplementary application.

Using the interfaces of application 300, the supplementary application may take advantage of the existing capabilities of application 300 (i.e., actions collection 304 and tasks collection 306) to perform processing and/or analysis that is outside of the predefined set of processing for which application 300 is configured. This flexibility allows network operators to develop supplementary applications to automate processing and/or analysis of data collected by data collection devices 202, thereby simplifying the identification and resolution of problems within network 100.

Application 300 may receive a request to perform an action involving data collected by data collection devices 202 from the supplementary application via, for example, one or more API calls made by the supplementary application. In response to receiving the request, application 300 may perform the action using, for example, one or more of the actions of actions collection 304 and/or one or more of the tasks of tasks collection 306.

The action requested by the supplementary application and executed by application 300 may take many different forms. For example, the action could include application 300 controlling one or more of data collection devices 202 to begin generating configuration and/or behavior data related to network 100. The action could include application 300 retrieving data from one or more of data collection devices 202 and returning the data to the supplementary application. Alternatively or additionally, the supplementary application could request (e.g., via an API call) that application 300 format the retrieved data for presentation using a particular format. The action could be an SQL query of a database accessible to application 300.

For example, tasks collection 306 may include a task that formats the retrieved data, overlays the retrieved data on a map, and presents the map with the overlaid data to a user via user interface 208. Of course, tasks collection 306 may include tasks that present the data in other formats such as in a spreadsheet, chart, picture, or graph.

The supplementary application may take advantage of such presentation tasks of tasks collection 306 by requesting that application 300 execute such presentation tasks rather than the supplementary application formatting and presenting the data itself.

In another example, the supplementary application may request that application 300 filter data retrieved from data collection devices 202 to identify a subset of the data having a desired characteristic (e.g., calls dropped by base station 114, calls conducted by device 124 having a bit-error rate exceeding a threshold, base stations in which all channels were busy for more than 50% of an hour, data transmission sessions conducted by device 126 in which data had to be retransmitted more than twice, etc.)

The supplementary application may also request (e.g., via an API call) that application 300 correlate data retrieved from data collection devices 202. For example, the supplementary application may request that application 300 retrieve first call trace data from switching center 116 and second call trace data from device 124 and then correlate the first data and second data in time. Doing so may involve application 300 converting the first call trace data from a format native to switching center 116 to a standard format (e.g., a database record format) defined by application 300 and converting the second call trace data from a format native to device 124 to the standard format.

The supplementary application may then request that application 300 display the correlated data in a table so that for a particular time, data collected by switching center 116 at the particular time is displayed side by side with data collected by device 124 at the particular time. Doing so may be useful to the network operator since the data collected by switching center 116 may include measurements made by one of the base stations of a first signal transmitted by device 124 and the data collected by device 124 may include measurements made by device 124 of a second signal transmitted by the base station. The first and second signals may both be associated with a same phone call and a network operator may find it useful to compare the substantially simultaneous measurements of the first signal and the second signal in determining why the phone call dropped.

This method of correlating data discussed immediately above might not be part of the predefined set of processing and/or analysis of application 300. However, as was illustrated above, application 300 may be capable of performing the correlation method when controlled by the supplementary application because the supplementary application may use actions collection 304 and/or tasks collection 306 to accomplish the correlation method. In doing so, the supplementary application may define a new task that does not belong to tasks collection 306, yet is made up of actions and/or tasks that do belong to actions collection 304 and/or tasks collection 306.

When the supplementary application makes a request of application 300 (e.g., via an API call), the supplementary application may ask that the request be performed with a particular priority. Task manager 302 of application 300 may receive the desired priority and may schedule the request in relation to other actions, tasks, and/or processing already scheduled to be performed by application 300 based on the desired priority, or may schedule the request to be executed at a particular time or during a particular portion of a day.

Furthermore, the supplementary application may ask that a request be performed more than once. Task manager 302 may, in response, schedule the request to occur more than once. For example, task manager 302 may schedule application 300 to perform the request (e.g., one or more tasks or actions) daily, weekly, monthly, or a particular number of times. In this manner, application 300 may repeat execution of the request more than once without receiving an additional request from the supplementary application. This method may be useful to a network operator who, for example, may want to have a particular analysis performed every morning.

Additionally or alternatively, the supplementary application may ask that a request be performed in response to an event occurring in network 100. For example, the supplementary application may ask that data be acquired at switching center 116 if one of the base stations of network 100 becomes disabled. Task manager 302 may receive this request and keep the request pending but not executed until task manager 302 determines that a base station of network 100 has become disabled, at which point task manager 302 may perform the request and may, in an embodiment, make execution of the task higher in priority than other tasks being executed by application 300.

In an embodiment, processing circuitry 206 may be capable of executing more than one thread and/or process. Accordingly, when the supplemental application requests execution of a task, task manager 302 may spawn a new process or thread to execute the task. Task manager 302 may monitor the process or thread so that task manager 302 knows when the task has been completed.

Prior to performing requests made by the supplemental application, application 300 may perform authentication and/or authorization actions. In an embodiment, the supplemental application may provide authentication information to authorization manager 308 such as a user name, password, authentication key, and the like. Authorization manager 308 may examine the authentication information and determine whether the supplemental application is authorized to make requests of application 300. In an embodiment, the supplemental application may provide authentication information as part of some or all API calls made to application 300.

In an embodiment, authorization manager 308 may establish different authorization levels so that authorization manager 308 allows that supplemental application to call one set of APIs if the supplemental application is associated with a first authorization level and to call a different set of APIs if the supplemental application is associated with a second authorization level. In this manner, authorization manager 308 may prevent the supplemental application from calling some APIs. For example, authorization manager 308 may ignore API calls that delete data that are received from a supplemental application having one authorization level, but may allow such API calls from a supplemental application having a different authorization level. In an embodiment, authorization manager 308 may ignore or allow API calls based on a license agreement.

In an embodiment, application 300 may be executed by processing circuitry 206 and the supplemental application may be executed by a different processing circuitry that is physically distinct from processing circuitry 206. For example, the supplementary application may be executed by user device 210.

In another embodiment, processing circuitry 206 may execute both application 300 and the supplemental application. Despite this, however, in some embodiments, application 300 may execute in a different memory space than the supplemental application. In other words, application 300 and the supplemental application may have different memory structures so that variables used by application 300 might not be directly accessible to the supplemental application except via an API call and vice versa.

In an embodiment, application 300 may be compiled independent of the supplemental application and the supplemental application may be compiled independent of application 300. In other words, at compilation, application 300 need not know about the supplemental application and vice versa. As a result, application 300 may be compiled code in the form of a first set of one or more executables and the supplemental application may be compiled code in the form of a second set of one or more executables different from the first set.

As an alternative to using a supplemental application, a network operator may prepare a script containing a set of actions and/or tasks belonging to actions collection 304 and/or tasks collection 306 to perform processing and/or analysis that is outside of the predefined set of actions, tasks, and/or analysis (discussed above) that application 300 is configured to perform. In an embodiment, the script may contain text instructing application 300 to perform actions and/or tasks from actions collection 304 and/or tasks collection 306. The text may be human readable and may be in a programming language. The text may call a supplemental application (described above) in an embodiment.

Application 300 may access the script and perform the actions and/or tasks contained in the script. In an embodiment, a user may submit the script to application 300 via user interface 208. In another embodiment, a user may store a file containing the script in storage circuitry 204 and instruct (e.g., via user interface 208) application 300 to access the file. The script may include some or all of the features described above in relation to the supplemental application. For example, the script may contain priority information used by task manager 302 in executing the script and/or authorization manager 308 may perform authentication and/or authorization of the script or user who submitted the script prior to application 300 executing the script.

Referring to FIG. 4, an example script 400 according to an embodiment is illustrated. FIG. 4 is provided to illustrate one possible embodiment. Other embodiments including fewer, more, or alternative components are also possible.

Note that the example script includes a plurality of requests arranged sequentially. In an embodiment, application 300 may include a script editor that provides a user with help text and may automatically identify syntax errors in the script. The script may be written using Visual Basic .NET syntax, in an embodiment.

In an embodiment, application 300, the supplemental application, and/or a script may automatically monitor for the presence of ordered data (described above) without user intervention and upon detecting the ordered data, may process the ordered data without user intervention.

For example, in an embodiment, test device 124 may collect configuration and/or behavior data associated with network 100 while test device 124 is being transported on a route through the geographic area associated with network 100. The data may be referred to as ordered data. Upon completion of the route, the ordered data may be provided to application 300 (e.g., by uploading the ordered data to storage circuitry 204. Application 300 and/or the supplemental application may detect the presence of the ordered data (e.g., by monitoring a particular location or folder of storage circuitry 204) and upon detecting the ordered data, may process the data using one or more of the processing operations described herein (e.g., by decompressing and filtering the data). Furthermore, application 300 and/or the supplemental application may generate a report (such as one of the reports described herein) that includes the processed ordered data and may make the report available to a network operator.

Similarly, application 300 and/or the supplemental application may monitor for the presence of ordered data generated by the base stations of network 100 or switching center 116 and upon detecting the ordered data, may process the ordered data without user intervention.

In an embodiment, the ordered data may be transferred to storage circuitry 204 and application 300 and/or the supplemental application may detect the presence of the ordered data in storage circuitry 204. In another embodiment, application 300 and/or the supplemental application may detect the presence of the ordered data in the data collection device of network 100 that generated the data.

The methods of detecting and processing ordered data described above may advantageously enable application 300 and/or the supplemental application to process ordered data immediately after the data collection device(s) generating the ordered data have finished generating the ordered data and provide reports associated with the ordered data. Without these methods, a network operator may need to manually inform application 300 and/or the supplemental application that the ordered data is available and manually initiate processing of the ordered data by application 300 and/or the supplemental application. This may be inconvenient and/or inefficient, especially if completion of collection of the ordered data occurs at a time when the network operator is not working (e.g., at night).

According to another aspect of the invention, a communications-network data presentation method includes receiving information indicating a source of data characterizing a communications network and a desired presentation format of the data, accessing the source to obtain the data characterizing the communications network, and presenting the data according to the desired presentation format.

The source may be a device connected to the communications network. The communications network may be a wireless-communications network and the data may include data gathered from one or more devices connected to the wireless-communications network. The one or more devices may include at least one of a wireless telephone, a frequency scanner, a drive test device, a base station, or an operations support system.

The receiving of the information may include receiving the information from a user via selections the user makes with a graphical user interface.

The information may indicate a range of time over which the data was collected by a device connected to the communications network. The information may be referred to as first information and the method may further include receiving second information indicating a desired procedure for processing the data prior to presenting the data.

The presenting may include presenting using a format that is user configurable. The presenting of the data may include presenting a map on which the data has been overlaid.

According to another aspect of the invention, a communications-network data presentation system includes one or more devices connected to a communications network and processing circuitry. The processing circuitry is configured to receive information describing data characterizing the communications network and a desired presentation format of the data and access at least one of the one or more devices to obtain the data. The system also includes a user interface configured to present the data according to the desired presentation format.

The manner in which application 300 presents data collected from data collection devices 202 can aid a network operator in identifying problems with network 100. Although application 300 may offer a user a number of standard reports, these reports might not display the data in a manner that is useful to the network operator. Accordingly, application 300 may be configured to allow a user to develop a custom report tailored to his needs. In an embodiment, application 300 includes a graphical user interface configured to allow a user to design a custom report.

Figure 5:
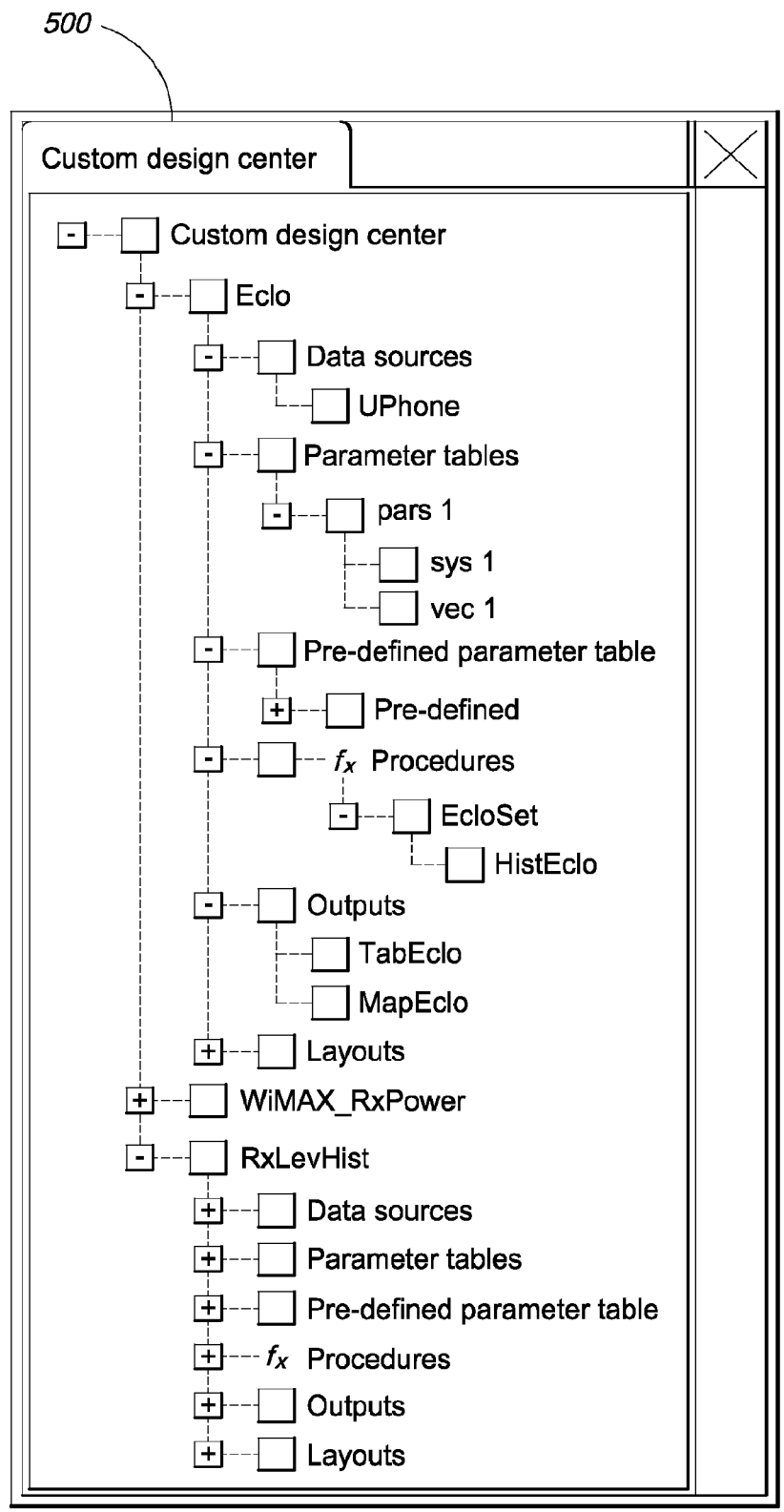
FIG. 5 illustrates a graphical user interface according to an embodiment.

Referring to FIG. 5, an example of a graphical user interface (GUI) 500 configured to allow a user to create a custom report containing configuration and/or performance data related to wireless-communications network 100 according to an embodiment is illustrated. FIG. 5 is provided to illustrate one possible embodiment. Other embodiments including fewer, more, or alternative components are also possible. In addition, some components of FIG. 5 may be combined in some embodiments.

A user may use GUI 500 to provide information to application 300 regarding a desired presentation format of data collected by one or more of data collection devices 202 and/or a desired processing to be applied to the data.

As is illustrated, GUI 500 may allow the user to select a data source (e.g., one or more of data collection devices 202) and parameters to be applied to the data. The parameters may be used to restrict the data presented in the report so that the data presented in the report has one or more characteristics. For example, a parameter may specify that only data from the data source that falls within a particular date and/or time range is to be presented in the report.

GUI 500 may also allow the user to select procedures to be applied to the data such as filtering, compression, correlation, averaging, and the like. In an embodiment, GUI 500 may allow the user to select a script (e.g., the script described above) to be applied to the data or to select a supplemental application (described above) to be applied to the data. Once application 300 has subjected the data to the selected procedures, the data may be referred to as processed data. GUI 500 may also allow the user to select an output format for the processed data such as a table, chart, graph, map, HTML file, picture file, and the like. GUI 500 may also allow the user to select a layout for the output format. Selecting the layout may include, for example, selecting sizes, colors, arrangements, fonts, file types, and the like that are applied to the output format.

Upon receiving the data source, parameter, procedure, output format, and/or layout information from a user via GUI 500, application 300 may access data collection devices 202, retrieve the desired data and apply the desired parameters and procedures to the data. This results in processed data which application 300 then presents according to the selected output format and layout.

Figure 6:
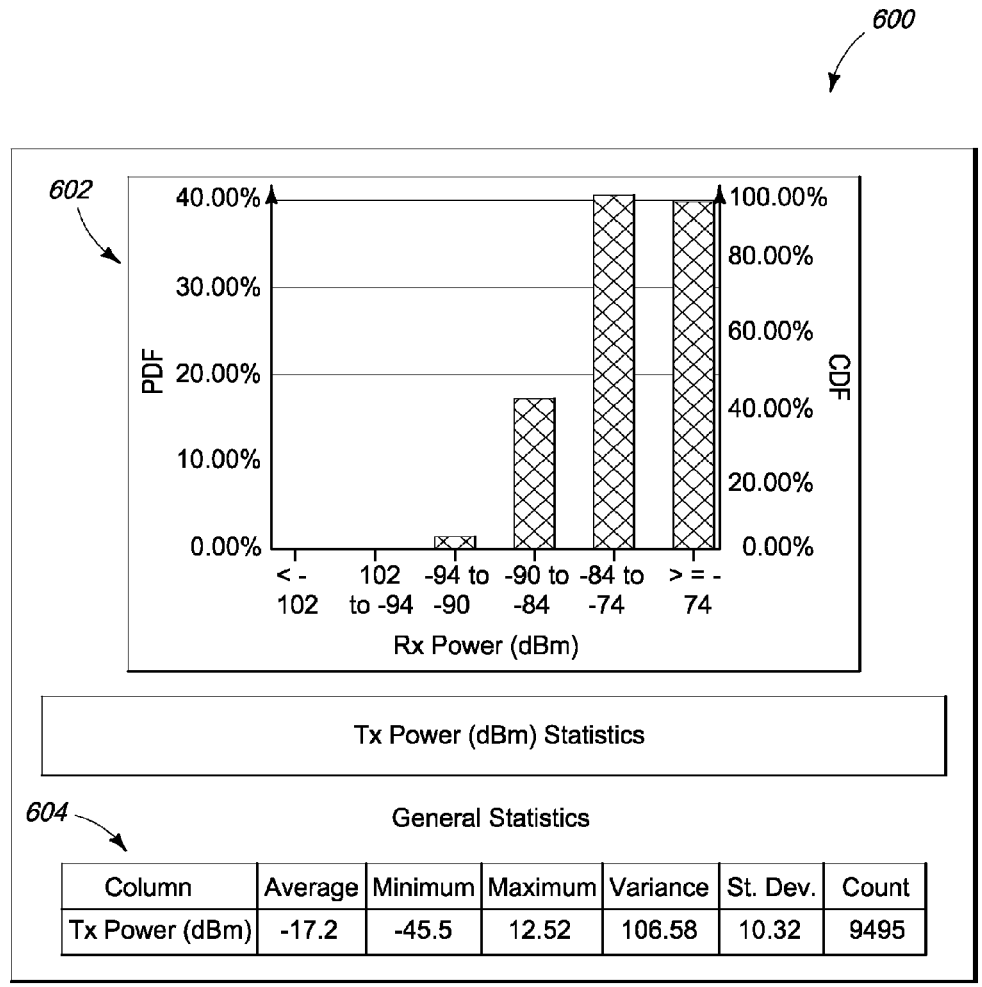
FIG. 6 illustrates a report according to an embodiment.

Referring to FIG. 6, an example report 600 according to an embodiment is illustrated. FIG. 6 is provided to illustrate one possible embodiment. Other embodiments including fewer, more, or alternative components are also possible.

Report 600 may be the result of a user using GUI 500 to instruct application 300. Report 600 may be presented via user interface 208 and/or user device 210 (e.g., via a web browser).

Report 600 includes a chart 602 illustrating receive power level data. The power level data may be data from one or more of base stations 102, 104, 106, 108, 110, 112, or 114 or may be receive power level data from one or more of devices 124, 126, or 128. Report 600 also includes a table 604 illustrating statistics related to transmit power levels of signals transmitted by one or more of base stations 102, 104, 106, 108, 110, 112, or 114 or devices 124, 126, or 128.

Figure 7:
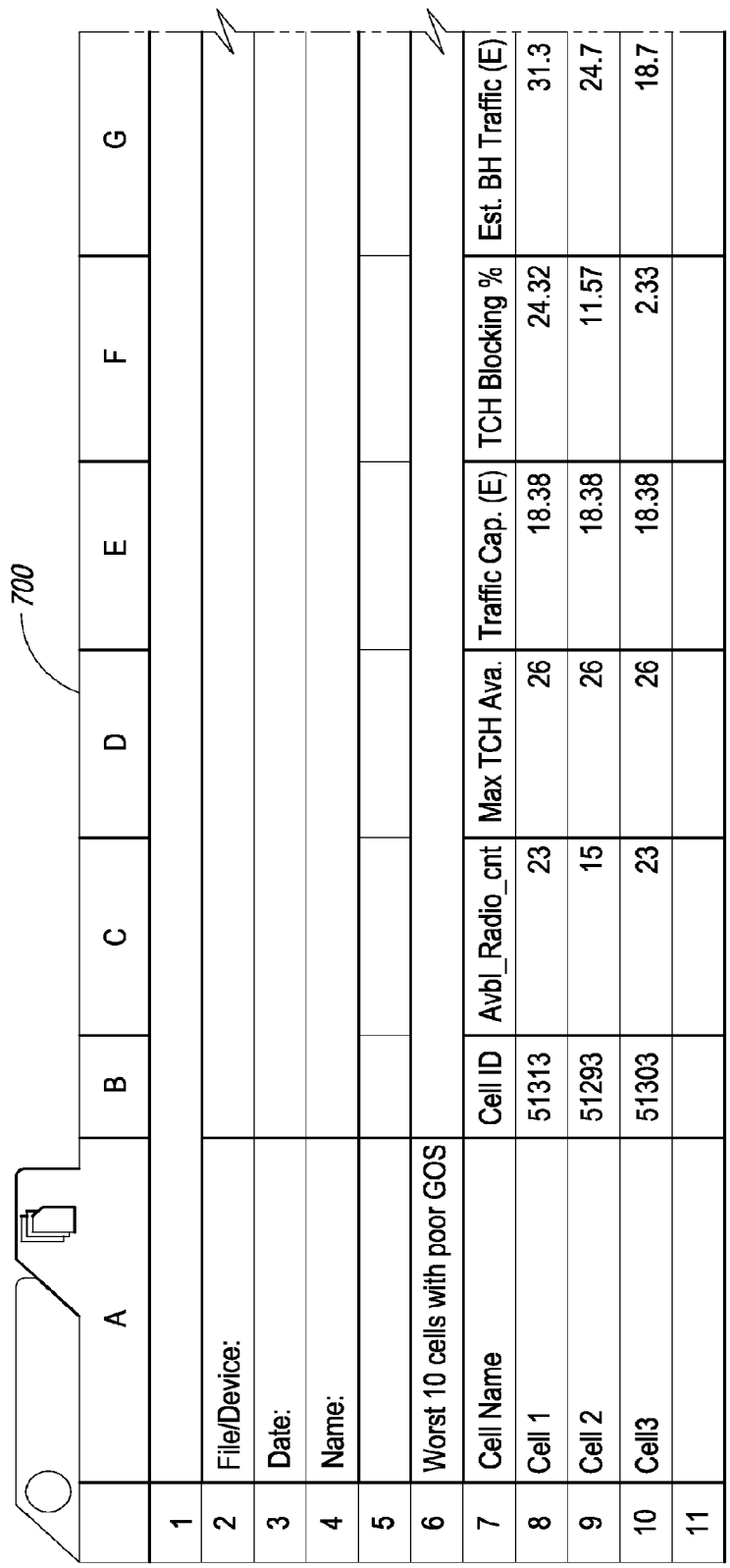
FIG. 7 illustrates a report according to an embodiment.

Referring to FIG. 7, an example report 700 according to an embodiment is illustrated. FIG. 7 is provided to illustrate one possible embodiment. Other embodiments including fewer, more, or alternative components are also possible.

Report 700 may be the result of a user using GUI 500 to instruct application 300. Report 700 may be presented via user interface 208 and/or user device 210 (e.g., via a web browser). Report 700 is a spreadsheet containing grade of service (GOS) data and base station usage data. Report 700 includes configuration data retrieved from network 100, such as the available radio count in column C, as well as behavior data retrieved from network 100 such as the traffic channel blocking percentage in column F. Report 700 includes data calculated by application 300 based on data retrieved from data collection devices 202, such as the estimated busy hour traffic in Erlangs in column G.

Figure 8:
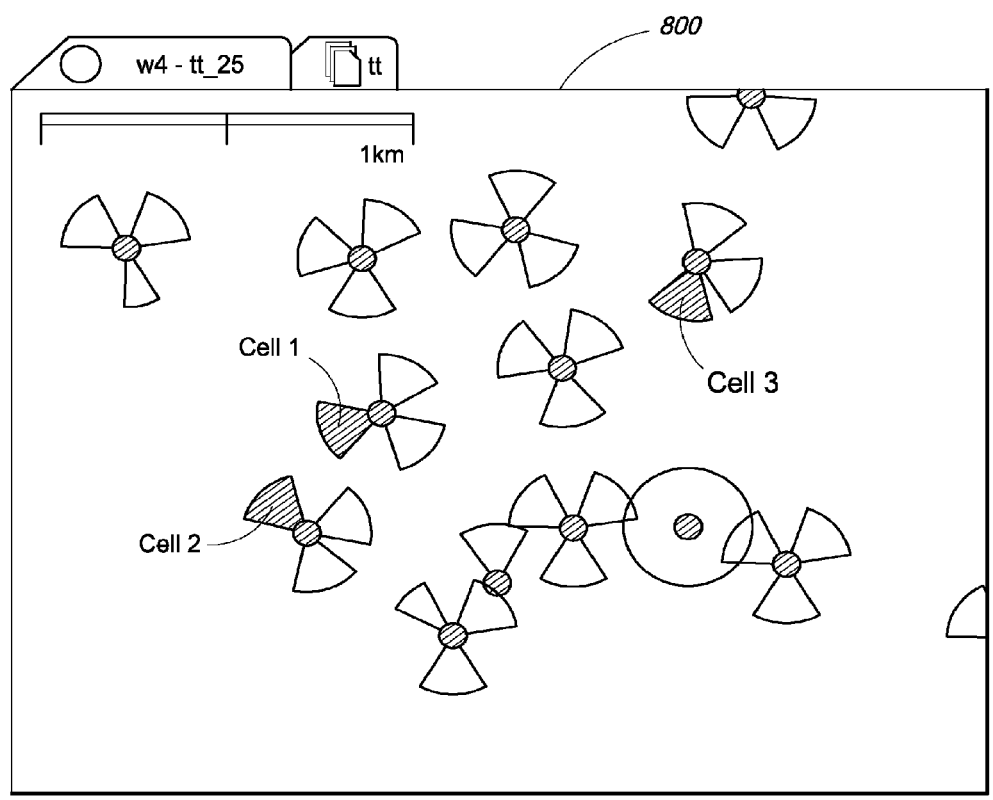
FIG. 8 illustrates a report according to an embodiment.

Referring to FIG. 8, an example report 800 according to an embodiment is illustrated. FIG. 8 is provided to illustrate one possible embodiment. Other embodiments including fewer, more, or alternative components are also possible.

Report 800 may be the result of a user using GUI 500 to instruct application 300. Report 800 may be presented via user interface 208 and/or user device 210 (e.g., via a web browser). Report 800 is a geographical representation of the location of base stations relative to one another. In an embodiment (not illustrated), report 800 could be overlaid on a street map to show the position of streets relative to the base stations. Report 800 illustrates configuration information retrieved from network 100 (via data collection devices 202) since it illustrates azimuths and beam widths of the antennas of each base station as well as the location of the base stations relative to one another. Report 800 also illustrates behavior information retrieved from network 100 because it illustrates, via shading, that cells 1, 2, and 3 have a particular behavior while the other cells do not. The shading may indicate that these cells have a grade of service below a threshold, or a usage above a threshold, or a quantity of dropped calls above a threshold, or other information.

In an embodiment, the user may convey the data source, parameter, procedure, output format, and/or layout information described above in relation to GUI 500 to application 300 via a user interface other than a GUI. For example, the user may convey the information via voice commands.

Although the discussion above primarily involves a wireless-communications network, the methods, systems, and programming described above may be used with other non-wireless communications networks as well.

Figure 10:
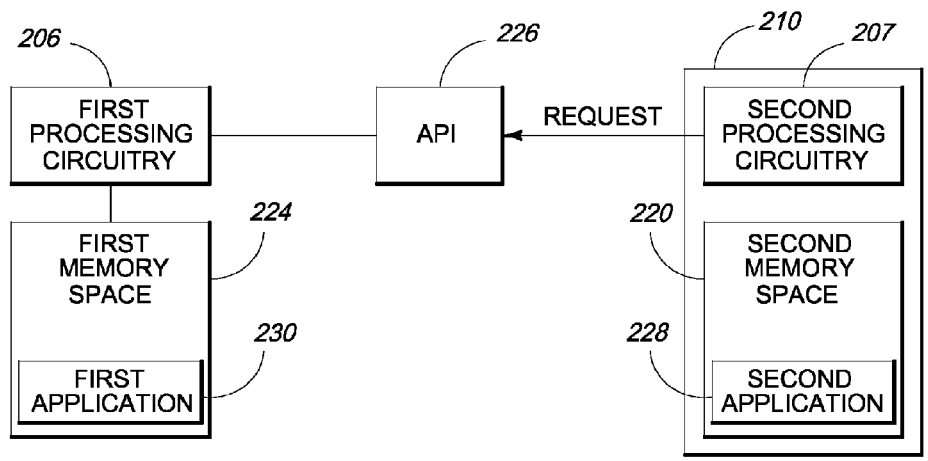
FIG. 10 is a functional block diagram of a data processing system according to one embodiment.

Referring to FIG. 10, additional example operations of a user device 210 are illustrated according to one embodiment. The user device 210 may communicate with components of the data processing system according to one embodiment. For example, the supplementary application (illustrated as second application 228 in the example of FIG. 10) may be executed within a second memory space 220 by second processing circuitry 207 of the user device 210. The second processing circuitry 207 may communicate with API 226 to request the performance of one or more action of first application 230 (which may be, for example, application 300) via an API call, in one embodiment. The action may be performed by first processing circuitry 206 within first memory space 224 in one embodiment. Storage circuitry 204 (not shown in FIG. 10) may include first memory space 224 in one embodiment.

The invention claimed is:

1. A communications-network data processing method comprising:
   receiving a request to perform an action involving data associated with a configuration of a communications network or a behavior of the communications network, wherein the receiving of the request comprises one or both of accessing a text script comprising the request and receiving an application programming interface (API) call comprising the request;
   in response to the receiving of the request, performing the action;
   wherein the receiving of the request comprises a first application receiving the request from a second application;
   the first application comprises code compiled independent of the second application; and
   executing the first application in a first memory space and wherein the second application is executed in a second memory space independent of the first memory space.

2. The method of claim 1 wherein the data is only accessible to the second application via the first application.

3. The method of claim 1 wherein the action is a function call or method call of a function or method implemented by the first application.

4. The method of claim 1 wherein the action comprises converting a first portion of the data from a first format associated with a first device connected to the communications network to a second format associated with the first application and converting a second portion of the data from a third format associated with a second device connected to the communications network to the second format, the first device having generated the first portion of the data and the second device having generated the second portion of the data.

5. The method of claim 1 further comprising receiving a desired priority with which the first application should perform the action and using the desired priority to determine when to perform the action relative to other actions already scheduled to be performed by the first application.

6. The method of claim 1 wherein the action comprises filtering the data to identify a subset of the data having a desired characteristic.

7. The method of claim 1 wherein the action comprises acquiring the data from a device connected to the communications network.

8. The method of claim 1 wherein the action comprises correlating in time or location a first portion of the data with a second portion of the data.

9. The method of claim 1 wherein the action comprises requesting that a device connected to the communications network collect the data.

10. The method of claim 1 wherein the communications network is a wireless-communications network and the data comprises at least one of dropped call data, blocked call data, wireless signal strength data, base station configuration data, antenna configuration data, call status data, call trace data, or handoff data.

11. The method of claim 1 wherein the request includes a key and further comprising authenticating the request using the key prior to performing the action.

12. The method of claim 1 further comprising validating that a user who provided the request is authorized to perform the action before performing the action.

* * * * *